US011153845B2

United States Patent
Kumar et al.

(10) Patent No.: US 11,153,845 B2
(45) Date of Patent: Oct. 19, 2021

(54) METHOD AND SYSTEM FOR HANDLING MOBILITY OF USER EQUIPMENTS IN A PREDETERMINED ROUTE

(71) Applicant: Samsung Electronics Co., Ltd., Suwon-si (KR)

(72) Inventors: Lalith Kumar, Bangalore (IN); Arijit Sen, Bangalore (IN); Rajavelsamy Rajadurai, Bangalore (IN); Jagadeesh Gandikota, Bangalore (IN); Siva Selvaganesan, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/754,188

(22) PCT Filed: Oct. 10, 2018

(86) PCT No.: PCT/KR2018/011869
§ 371 (c)(1),
(2) Date: Apr. 7, 2020

(87) PCT Pub. No.: WO2019/074263
PCT Pub. Date: Apr. 18, 2019

(65) Prior Publication Data
US 2021/0219260 A1    Jul. 15, 2021

(30) Foreign Application Priority Data

Oct. 9, 2017   (IN) .............................. 201741035819
Oct. 8, 2018   (IN) .............................. 201741035819

(51) Int. Cl.
*H04W 64/00* (2009.01)
*G08G 5/00* (2006.01)
(Continued)

(52) U.S. Cl.
CPC ......... *H04W 64/006* (2013.01); *B64C 39/024* (2013.01); *G08G 5/003* (2013.01);
(Continued)

(58) Field of Classification Search
CPC ..... H04W 8/02–16; H04W 64/00–006; H04W 84/02
See application file for complete search history.

(56) References Cited

U.S. PATENT DOCUMENTS

2011/0098051 A1    4/2011  Kamalaraj et al.
2011/0210845 A1*   9/2011  Xiong ................... H04W 60/00
                                                340/539.13
(Continued)

OTHER PUBLICATIONS

ISA/KR, International Search Report and Written Opinion of the International Searching Authority, International Application No. PCT/KR2018/011869, dated Jan. 29, 2019, 10 pages.

*Primary Examiner* — Ronald Eisner

(57) ABSTRACT

The embodiments herein discloses a method and a network for handling UEs travelling in predefined/predetermined route. The method includes determining by a network one of at least one parameter and learned mobility patterns of at least one UE. The at least one parameter is determined based on a negotiation with the at least one UE. The at least one parameter includes at least one of a source information, a destination information, a speed, a start time, a guard percentage, and a predefined route of the at least one UE. Further, the method includes sending at least one pair of a tracking area identifier list (TAI'S) and a timing map to the at least one UE based on one of the determined at least one parameter and the learned mobility patterns of the at least one UE.

15 Claims, 13 Drawing Sheets

(51) Int. Cl.
  *B64C 39/02* (2006.01)
  *H04W 84/02* (2009.01)
(52) U.S. Cl.
  CPC ......... *H04W 64/003* (2013.01); *H04W 84/02* (2013.01); *B64C 2201/122* (2013.01)

(56) References Cited

U.S. PATENT DOCUMENTS

| | | |
|---|---|---|
| 2012/0071173 A1 | 3/2012 | Olsson et al. |
| 2014/0113666 A1* | 4/2014 | Arvidsson ............. H04W 68/02 455/458 |
| 2016/0088462 A1 | 3/2016 | Jin et al. |

* cited by examiner

METHOD AND SYSTEM FOR HANDLING MOBILITY OF USER EQUIPMENTS IN A PREDETERMINED ROUTE

CROSS-REFERENCE TO RELATED APPLICATIONS

This application is a 371 National Stage of International Application No. PCT/KR2018/011869, filed Oct. 10, 2018, which claims priority to Indian Patent Application No. 201741035819, filed Oct. 9, 2017, and Indian Patent Application No. 201741035819, filed Oct. 8, 2018, the disclosures of which are herein incorporated by reference in their entirety.

DESCRIPTION OF RELATED ART

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

SUMMARY

The principal object of the embodiments herein is to disclose a method and a network for handling User Equipment's (UEs) travelling in predefined route, wherein the method includes determining by a network one of at least one parameter and learned mobility patterns of at least one UE and sending at least one pair of a tracking area identifier list (TAI's) and a timing map to the at least one UE based on the determined one of at least one parameter and the learned mobility patterns of the at least one UE to handle the UE travelling in the predefined route.

The other object of the embodiments herein is to indicate at least one paging request in at least one paging cell and at least one guard cell present in a current location of the UE travelling in the predefined route.

The other object of the embodiments herein is to enable the at least one UE to prioritize measuring one or more frequencies associated with the TAI's present in the predefined route. Further, the method includes enabling by the network, the at least one UE to renegotiate the at least one parameter with the network, if a camped cell doesn't match with the one or more frequencies associated with the TAI's.

The other object of the embodiments herein is to send a context of the at least one UE to a plurality of cells associated with the TAI's of the predefined route and enable the at least one UE to latch on to a cell associated with the TAI's present in the predefined route based on the current location of the at least one UE.

The other object of the embodiments herein is to enabling a serving Access and Mobility Management function (AMF) to send a context of the at least one UE to another AMF automatically, if the at least one UE expected to be camped on to at least one cell belongs to the another AMF in the predefined route.

The other object of the embodiments herein is to determine an emergency situation in the predefined route and alert the at least one UE regarding the determined emergency situation present in the predefined route through a message.

The other object of the embodiments herein is to determine at least one service request to uplink data from the at least one UE while travelling in the predefined route and allocating at least one of a time, a location and a cell information for the corresponding at least one UE based on at least one of the determined at least one parameter and the learned mobility patterns to complete the corresponding at least one service request for the uplink data.

The other object of the embodiments herein is to receive at least one service request from the at least one UE while travelling in the predefined route and indicate a service indication message for the requested at least one service request to serve the at least one UE for the requested at least one service.

BRIEF DESCRIPTION OF THE DRAWINGS

Embodiments herein are illustrated in the accompanying drawings, throughout which like reference letters indicate corresponding parts in the various figures. The embodiments herein will be better understood from the following description with reference to the drawings, in which.

DETAILED DESCRIPTION

Figure 1:
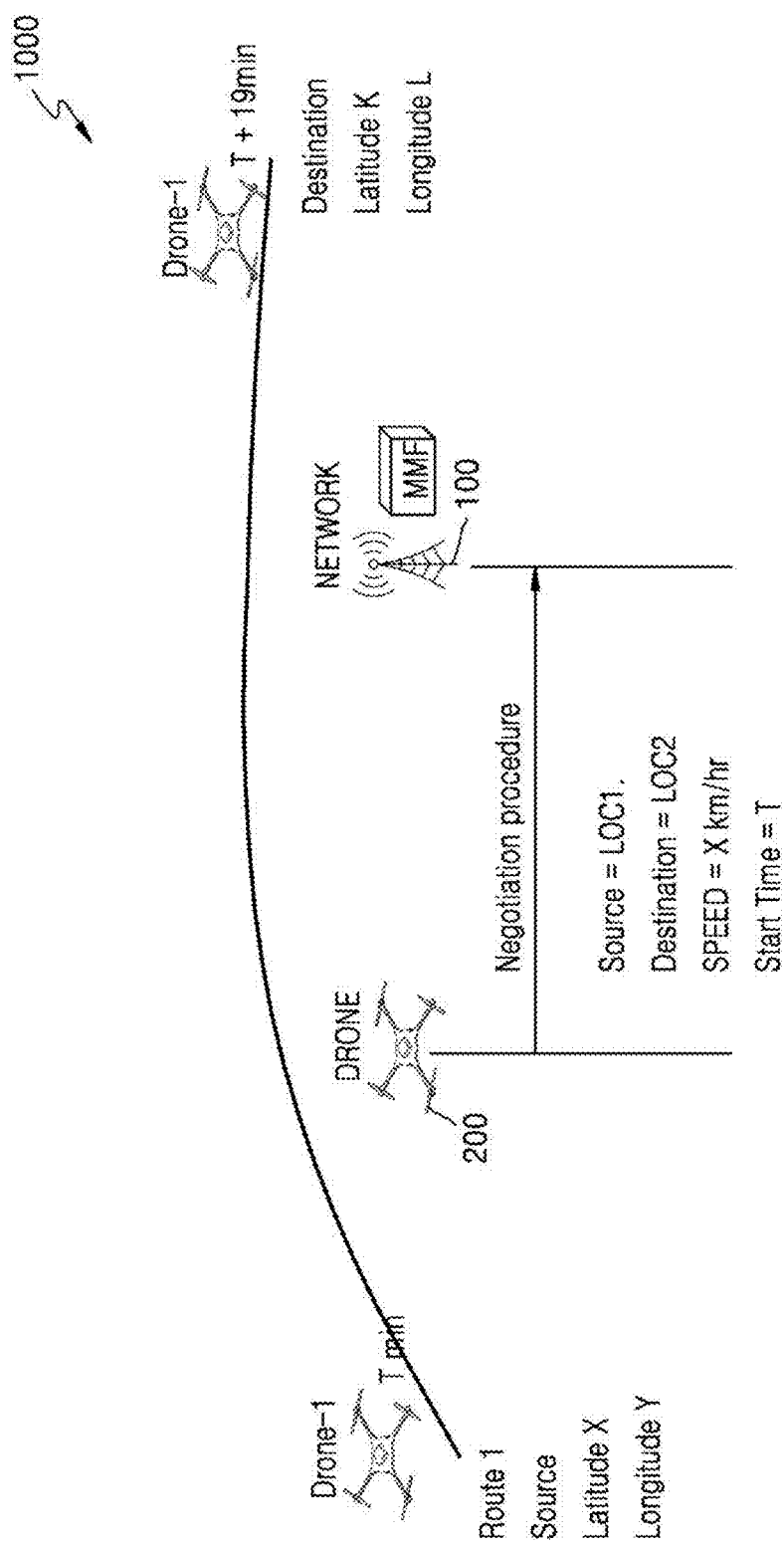
FIG. 1 is an example schematic system 1000 diagram illustrating a User Equipment (UE)/Drone and a network negotiating at least one parameter of the UE to handle the UE travelling in a predefined route/predetermined route, according to an embodiment as disclosed herein.

Accordingly the embodiments herein provide a method and a network for handling User Equipment's (UEs) travelling in predefined route. The method includes determining by a network one of at least one parameter and learned mobility patterns of at least one UE. The at least one parameter is determined based on a negotiation with the at least one UE. The method includes sending, by the network, at least one pair of a tracking area identifier list (TAI's) and a timing map to the at least one UE based on the determined one of the at least one parameter and the learned mobility patterns of the at least one UE.

The at least one parameter includes at least one of a source information, a destination information, a speed, a start time, a guard percentage, and a predefined route of the at least one UE.

Further, the method includes sending at least one pair of a tracking area identifier list (TAI's) and a timing map to the at least one UE based on one of the determined at least one parameter and the learned mobility patterns of the at least one UE to handle the UE travelling in the predefined route.

The at least one UE triggers a new registration procedure to indicate a current location of the at least one UE to the network, if the at least one UE is not following the learned mobility pattern or is not present in the TAI's during a corresponding time frame in the received at least one pair of the TAI's and the timing map from the network.

The at least one UE is registered with the network, if the at least one UE present in any one of a TAI during the corresponding time frame received in the at least one pair of the TAI's and the timing map form the network.

In an embodiment, the method further includes determining by the network, at least one paging cell and at least one guard cell to indicate at least one paging request to the at least one UE travelling in the predefined route. The at least one paging cell is determined based on one of the determined at least one parameter and the learned mobility patterns. The at least one guard cell is determined based on the guard percentage negotiated with the at least one UE. Further, the method includes indicating by the network, the determined at least one paging request in the determined at least one paging cell (i.e., expected cell) and the at least one guard cell present in a current location of the UE in the predefined route.

In an embodiment, the method further includes enabling the at least one UE to prioritize measuring one or more frequencies associated with the TAI's present in the predefined route. Further, the method includes enabling by the network, the at least one UE to renegotiate the at least one parameter with the network, if a camped cell doesn't match with the one or more frequencies associated with the TAI's.

In an embodiment, the method further includes sending by the network a context of the at least one UE to a plurality of cells associated with the TAI's of the predefined route, wherein the context of the at least one UE is determined based on one of the determined at least one parameter and the learned mobility patterns of the at least one UE. Further, the method includes enabling by the network, the at least one UE to latch on to a cell associated with the TAI's present in the predefined route based on the current location of the at least one UE, wherein the cell indicates its previous cell to release the context of the UE.

In an embodiment, the method further includes enabling a serving Access and Mobility Management function (AMF) to send a context of the at least one UE to another AMF automatically, if the at least one UE expected to be camped on to at least one cell belongs to the another AMF in the predefined route.

In an embodiment, the method further includes determining by the network, an emergency situation in the predefined route where the at least one UE is travelling. Further, the method includes alerting by the network the at least one UE regarding the determined emergency situation present in the predefined route through a message (i.e., broadcast warning message), wherein the message includes details of a safety location to land in the predefined route.

In an embodiment, the method further includes determining by the network, at least one service request to uplink data from the at least one UE while travelling in the predefined route. Further, the method includes allocating by the network, at least one of a time, a location and a cell information for the corresponding at least one UE based on one of the determined at least one parameter and the learned mobility patterns to complete the corresponding at least one service request for the uplink data.

In an embodiment, the method further includes receiving by the network, at least one service request from the at least one UE while travelling in the predefined route. Further, the method includes indicating by the network, a service indication message for the requested at least one service request to serve the at least one UE for the requested at least one service, wherein the service indication message includes at least one of a cell id, location details, available services, congestion details and coverage information.

Accordingly the embodiments herein provide a system for handling User Equipment's (UEs) travelling in predefined route. The system includes a network, communicatively connected to at least one UE configured to determine one of at least one parameter and learned mobility patterns of with at least one User Equipment (UE). The at least one parameter is determined based on a negotiation with the at least one UE.

The at least one parameter includes at least one of a source information, a destination information, a speed, a start time, a guard percentage, and a predefined route of the at least one UE.

Further, the network configured to send at least one pair of a tracking area identifier list (TAI's) and a timing map to the at least one UE based on one of the determined at least one parameter and the learned mobility patterns of the at least one UE to handle the UE travelling in the predefined route.

The at least one UE registered with the network, if the at least one UE present in any one of a TAI's during the corresponding time frame received in the at least one pair of the TAI's and the timing map from the network.

The at least one UE triggers a new registration procedure to indicate a current location of the at least one UE to the network, if the at least one UE is not following the learned mobility pattern or is not present in the TAI's during a corresponding time frame received in the at least one pair of the TAI's and the timing map from the network.

In an embodiment, the network communicatively connected to the at least one UE, is further configured to enable the at least one UE to prioritize measuring one or more frequencies associated with the TAI's present in the predefined route; and enable the at least one UE to renegotiate the at least one parameter with the network, if a camped cell doesn't match with the one or more frequencies associated with the TAI's.

In an embodiment, the network communicatively connected to the at least one UE, is further configured to send a context of the at least one UE to a plurality of cells associated with the TAI's of the predefined route, wherein the context of the at least one UE is determined based on one of the determined at least one parameter and the learned mobility patterns of the at least one UE and enable the at least one UE to latch on to a cell associated with the TAI's present in the predefined route based on the current location of the at least one UE, wherein the cell indicates its previous cell to release the context of the UE.

In an embodiment, the network communicatively connected to the at least one UE, is further configured to enable a serving Access and Mobility Management function (AMF) to send a context of the at least one UE to another AMF automatically, if the at least one UE expected to be camped on to at least one cell belongs to another AMF in the predefined route.

In an embodiment, the network communicatively connected to the at least one UE is further configured to determine an emergency situation in the predefined route where the at least one UE is travelling and alert the at least one UE regarding the determined emergency situation present in the predefined route through a message, wherein the message includes details of a safety location to land in the predefined route.

In an embodiment, the network communicatively connected to the at least one UE further configured to determine at least one service request for uplink data from the at least one UE while travelling in the predefined route and allocate at least one of a time, a location and a cell information for the corresponding at least one UE based on one of the determined at least one parameter and the learned mobility patterns to complete the corresponding at least one service request for the uplink data.

In an embodiment, the network communicatively connected to the at least one UE further configured to receive at least one service request from the at least one UE while travelling in the predefined route and indicate a service indication message for the requested at least one service request to serve the at least one UE for the requested at least one service, wherein the service indication message includes at least one of a cell id, location details, available services, congestion details and coverage information.

The at least one paging cell is determined based on the determined one of at least one parameter and the learned mobility patterns and the at least one guard cell is determined based on the guard percentage negotiated with the at least one UE to Indicate the at least one paging request in the determined at least one of paging cell and the at least one guard cell present in a current location of the at least one UE in the predefined route.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

MODE FOR INVENTION

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

Currently, there have been increasing interests in intelligence and its application in Fifth-generation (5G) wireless networks. Therefore, the next generation networks need to be scalable and intelligent to serve the millions and billions of devices. These new generation networks offer various kinds of services to various kinds of devices and also different kinds of services at different locations. With the introduction of Internet of Things (IoT) devices and wearables, the number of devices connected to a network are going to be huge and a lot of signaling is generated.

In the recent years, there have been increasing interests in covering the aerial vehicles such as drones with cellular networks. The use cases of commercial drones are growing very rapidly and include package delivery, search-and-rescue, monitoring of critical infrastructure, wildlife conservation, flying cameras, and surveillance. All these use cases could see rapid growth and more will emerge in coming years. Many of these emerging use cases could benefit from connecting drones to the cellular network as a User Equipment (UE). Further, the drones will have a predefined travel path. The velocity/speed of travel can be measured and can be known beforehand and the source and destination of drones are always fixed.

Thus, there is a need for Intelligence in 5G systems to optimize the network resources and signaling reduction. Further, there is also a need to ensure the operating efficiency of the devices by ensuring limited signaling is exchanged and enhanced battery life is provided.

The embodiments herein achieve a method and a network for handling User Equipment's (UEs) travelling in predefined route. The method includes determining by a network one of at least one parameter and learned mobility patterns of at least one UE. The at least one parameter is determined based on a negotiation with the at least one UE. The at least one parameter includes at least one of a source information, a destination information, a speed, a start time, a guard percentage, and a predefined route of the at least one UE. Further, the method includes sending at least one pair of a tracking area identifier list (TAI's) and a timing map to the at least one UE based on one of the determined at least one parameter and the learned mobility patterns of the at least one UE to handle the UE travelling in the predefined route. The at least one UE registered with the network, if the at least one UE present in any one of a TAI during the corresponding time frame received in the at least one pair of the TAI's and the timing map form the network. The at least one UE triggers a new registration procedure to indicate a current location of the at least one UE to the network, if the at least one UE is not following the learned mobility pattern or not present in the TAI's during a corresponding time frame received in the at least one pair of the TAI's and the timing map.

In an embodiment, the method further includes determining by the network, at least one paging cell and at least one guard cell to indicate at least one paging request to the at least one UE travelling in the predefined route. The at least one paging cell is determined based on one of the determined at least one parameter and the learned mobility patterns. The at least one guard cell is determined based on the guard percentage negotiated with the at least one UE. Further, the method includes indicating by the network, the determined at least one paging request in the determined at least one paging cell (i.e., expected cell) and the at least one guard cell present in a current location of the UE in the predefined route.

In an embodiment, the method further includes enabling the at least one UE to prioritize measuring one or more frequencies associated with the TAI's present in the predefined route. Further, the method includes enabling by the network, the at least one UE to renegotiate the at least one parameter with the network, if a camped cell doesn't match with the one or more frequencies associated with the TAI's.

In an embodiment, the method further includes sending by the network a context of the at least one UE to a plurality of cells associated with the TAI's of the predefined route, wherein the context of the at least one UE is determined based on one of the determined at least one parameter and the learned mobility patterns of the at least one UE. Further. The method includes enabling by the network, the at least one UE to latch on to a cell associated with the TAI's present in the predefined route based on the current location of the at least one UE, wherein the cell indicates its previous cell to release the context of the UE.

In an embodiment, the method further includes enabling a serving Access and Mobility Management function (AMF) to send a context of the at least one UE to another AMF automatically, if the at least one UE expected to be camped on to at least one cell belongs to the another AMF in the predefined route.

In an embodiment, the method further includes determining by the network, an emergency situation in the predefined route where the at least one UE is travelling. Further, the method includes alerting by the network the at least one UE regarding the determined emergency situation present in the predefined route through a message (i.e., broadcast warning message), wherein the message includes details of a safety location to land in the predefined route.

In an embodiment, the method further includes determining by the network, at least one service request to uplink data from the at least one UE while travelling in the predefined route. Further, the method includes allocating by the network, at least one of a time, a location and a cell information for the corresponding at least one UE based on one of the determined at least one parameter and the learned mobility patterns to complete the corresponding at least one service request for the uplink data.

In an embodiment, the method further includes receiving by the network, at least one service request from the at least one UE while travelling in the predefined route. Further, the method includes indicating by the network, a service indication message for the requested at least one service request to serve the at least one UE for the requested at least one service, wherein the service indication message includes at least one of a cell id, location details, available services, congestion details and coverage information.

Referring now to the drawings, and more particularly to FIGS. 1 through 12, where similar reference characters denote corresponding features consistently throughout the figures, there are shown example embodiments.

FIG. 1 is an example of schematic system 1000 diagram illustrating the User Equipment (UE)/Drone 200 and the network 100 negotiating at least one parameter of the UE 200 to handle the UE 200 travelling in the predefined route/predetermined route, according to an embodiment as disclosed herein.

The embodiments herein provide a method for handling User Equipment's (UEs) 200 travelling in the predefined route. The UE 200 can be at least one of but not restricted to a mobile phone, a personal digital assistant (PDA), an internet of thing (IoT) devices, a smart watch, a drone or any other electronic device which travels only in predefined or fixed path.

The method includes negotiating by the UE 200 and the network 100 to determine the at least one parameter while the UE(s) 200 is initially registering with the network 100. The at least one parameter includes at least one of a source information, a destination information, a speed, a start time, a guard percentage, and a predefined route of the UE(s) 200. In an embodiment, the predefined route can be pre-configured in the UE 200. In another embodiment, the Network 100 itself can calculate the predefined route without any information received from the UE(s) 200 and optionally share this information to the UE(s) 200. In another embodiment, the Network 100 can identify the predefined route with information received from the UE(s) 200. For example, the network 100 receives a public transport travel mode (for example, train journey, air travel or the like) information and an identity (train number, flight number or the like) of a public transport on which a user of the at least one UE 200 is travelling, based on which the network 100 can decode the predefined travel route/path. In case, if a user of the UE(s) 200 is travelling with a help of navigation maps can share the predefined route details to the network 100 for negotiation. Further, the method includes sending by the network 100 at least one pair of tracking area identifier list (TAI's)/cells and a timing map to the UE(s) 200 based on the negotiated/determined at least one parameter. The timing map indicates one or more time frames at which the at least one UE 200 is expected to be present in a particular TAI in the predefined route. In an embodiment, the network 100 itself can determine the at least one pair TAI's and the timing map based on mobility patterns of the UE (s) 200 travelling in the predefined route. The at least one pair TAI's are the possible tracking areas (TAs) in the predefined route where the UE/Drone 200 can travel. For example the predefined route includes, the following TAI's, i.e., TAI 1, TAI 2, and TAI 3. The TAI 1 includes cell 1, cell 2, and cell 3, in which the UE(s) 200 travels in a time frame between 2 and 4. Similarly, the TAI 2 which includes cell 3, cell 4 and cell 5, in which the UE(s) 200 travels in the time frame between 3.30 and 5.30. Similarly, the TAI 3 which includes cell 5, cell 6 and cell 7, in which the UE(s) 200 travels in the time frame between 5.00 and 7.00. Therefore, the UE/Drone 200 doesn't require to trigger any location updates during changing in the TAI's to the network 100 while traveling in the predefined route in the predetermined time.

In an embodiment, a method includes determining by the network 100 the learned mobility patterns of the at least one UE 200 in the predefined route. Further, the method includes sending by the network 100 the at least one pair of TAI's and the timing map based on the learned mobility patterns. The timing map indicates the one or more time frames at which the at least one UE 200 is expected to be present in the particular TAI in the predefined route. The network 100 during a Non-Access Stratum (NAS) signaling procedure provides the at least one pair of the TAI's and the timing map to the at least one UE 200. The at least one UE registered with the network, if the at least one UE present in any one of a TAI's during the corresponding time frame received in the at least one pair of the TAI's and the timing map from the network. The at least one UE triggers a new registration procedure to indicate a current location of the at least one UE to the network, if the at least one UE is not following the learned mobility pattern or not present in the TAI's during a corresponding time frame received in the at least one pair of the TAI's and the timing map. For example, if a travel distance in the predefined route is 10 kilometers, let us assume each TAI is of 1 KM radius on the predefined route. If the speed is 1 KM per minute then (TAI1 00:00 A.M-00:01 A.M), (TAI2, 00:01 A.M.-00:02 A.M), (TAI3, 00:02 A.M-00:03 A.M), (TAI4, 00:03 A.M-00:04 A.M) or the like. Thus, if the at least one UE 200 is in the TAI1 between time duration/frame 00:00 A.M to 00:01 A.M then it is an expected behavior, similarly if the at least one UE 200 is in the TAI2 between 00:01 to 00:02 then it's an expected behavior. However, if the at least one UE 200 deviates from the expected behavior i.e. UE is moving to say TAI1 during time instant 00:04 A.M then the at least one UE 200 can trigger a registration update procedure to register again with network. While allocating the at least one pair of the TAI's and the timing map, the network 100 shall apply a guard time so that a small deviation does not affect the presence of the at least one UE 200 in the predefined route. For example, the above at least one s pair of the TAI's and the corresponding timing map allocation after the guard time of half a minute can be as follows (TAIL 00:00-00:01.5), (TAI2, 00:00.5-00:02.5), (TAI3, 00:01.5-00:03.5), (TAI4, 00:02.5-00:04.5) or the like. Further, if a MT (Mobile Terminated) data received at time instant 00:03 both TAI3 and TAI4 are paged simultaneously. The time can be in interval of unit possible as seconds, minutes, hours, weeks, days, months, years or the like. The day light saving factor has to be considered by the network 100. The timing map can be given in different possible ways which can help the at least one UE 200 to understand what is start time and end time. For example, the TAI's can be mapped to the start time and the end time of the day or the TAI's can be mapped to the start time of the day and number of hours, i.e. in this case end time is start time plus number of hours or the like.

Figure 2:
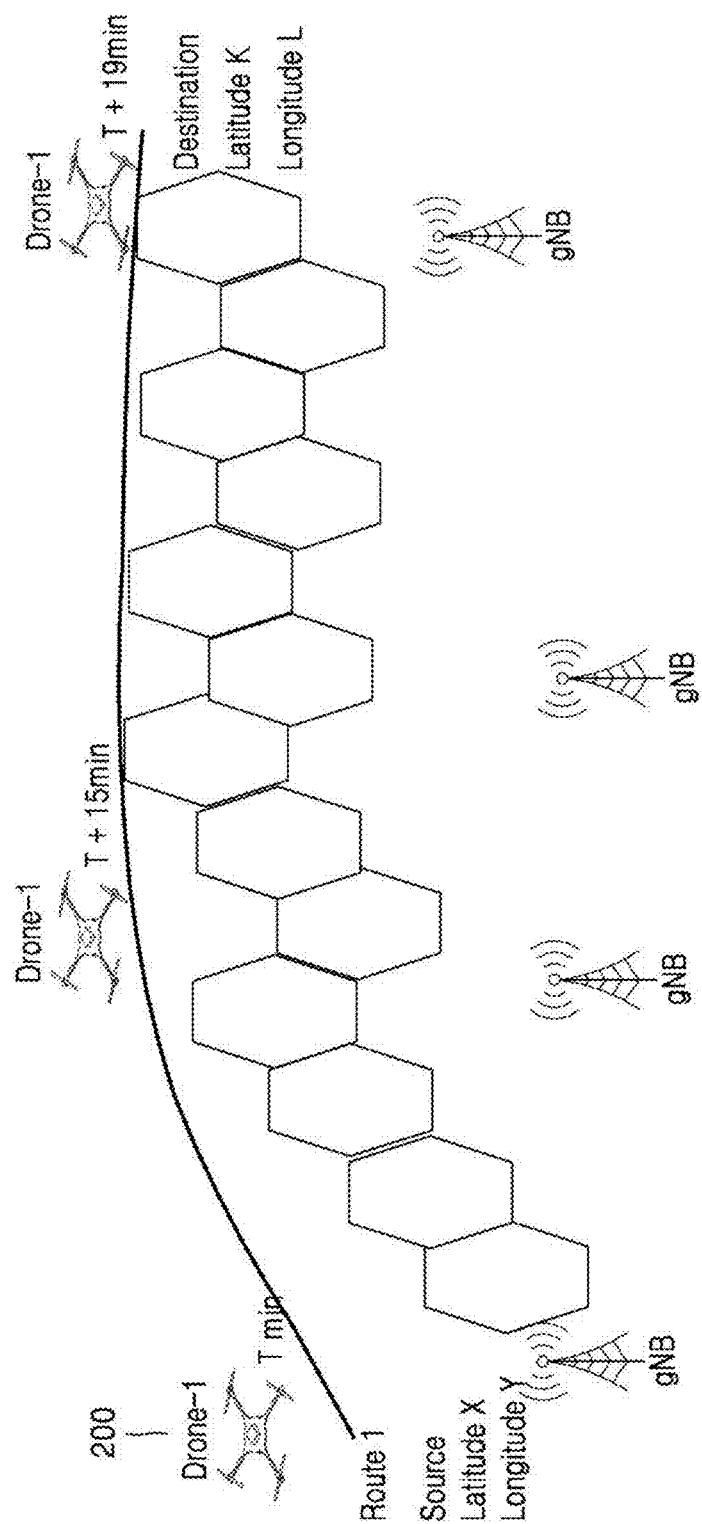
FIG. 2 is an example schematic diagram illustrating a dynamic allocation of at least one pair of TAI's and the timing map to the UE based on the negotiated parameters to avoid unnecessary location updates while travelling in the predefined route, according to an embodiment as disclosed herein.

FIG. 2 is an example schematic diagram illustrating a dynamic allocation of at least one pair of TAI's and the timing map to the UE 200 based on the negotiated parameters to avoid unnecessary location updates while travelling in the predefined route, according to an embodiment as disclosed herein.

The embodiments herein provide the method which allows the network 100 and the UE 200 to negotiate each other to derive one or more parameters. The one or more parameters includes at least one of the source information of the UE 200 at which the UE 200 starts its travel, the destination information of the UE 200 at which the UE 200 ends its travel, a speed of the UE 200 (i.e., travelling speed), a start time of the travel, a guard percentage, and a predefined route at which the UE(s) 200 travels. Based on the negotiated one or more parameters, the network 100 can dynamically send the at least one pair of the TAI's and the timing map corresponding to the predefined route to the UE(s) 200. The received at least one pair of TAI's and the timing map helps the UE 200 to avoid frequent updating of the location to the network 100, when the UE 200 changes from one TAI to another TAI in the predefined route.

Figure 3:
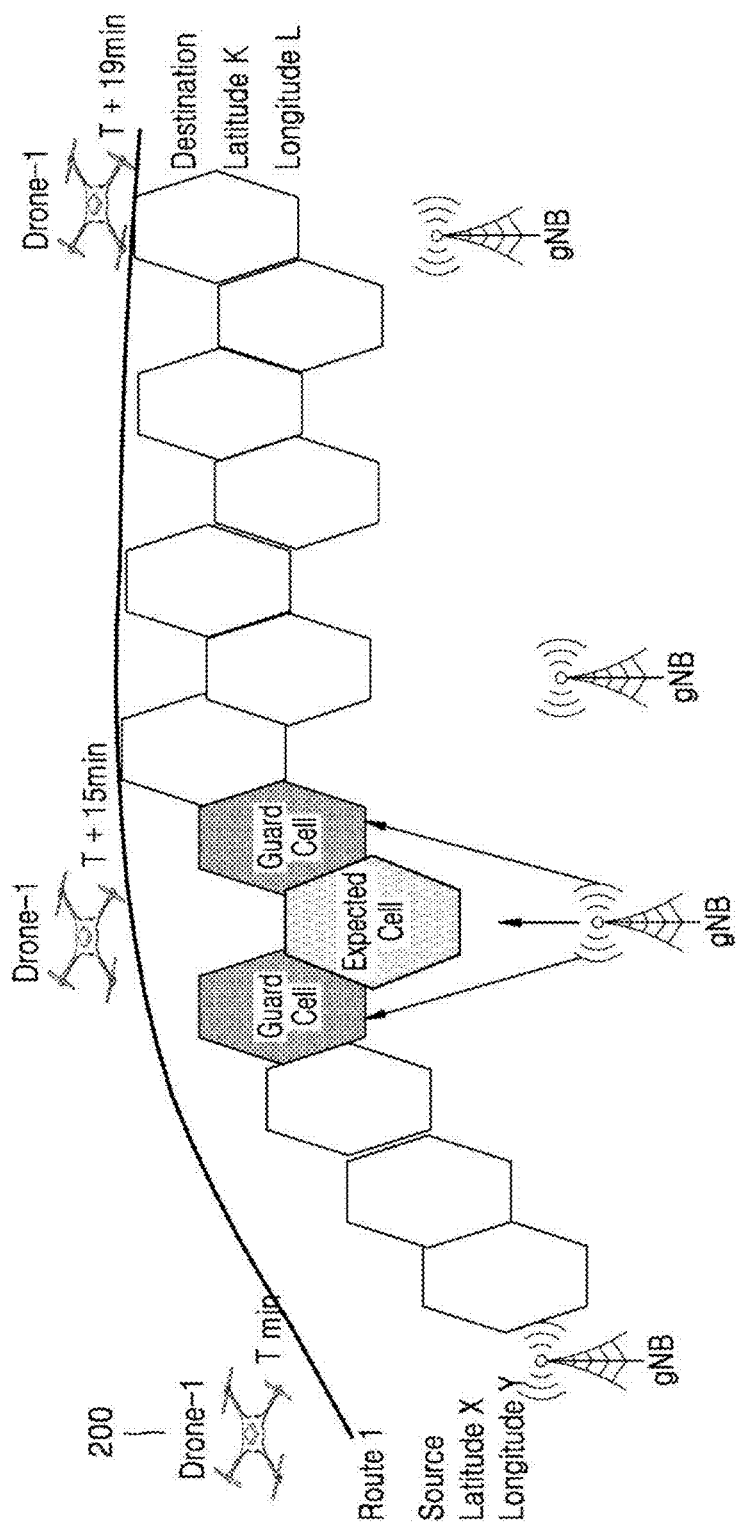
FIG. 3 is an example schematic diagram illustrating a paging optimization in a predefined route, according to an embodiment as disclosed herein.

FIG. 3 is an example schematic diagram illustrating a paging optimization in the predefined route, according to an embodiment as disclosed herein.

The embodiments herein help in performing the paging optimization. Initially, the UE(s) 200 and the network 100 can be configured to negotiate the one or more parameters of the UE 200, before the UE 200 starts travelling in the predefined route. Based on the negotiated parameters, the network 100 can be configured to share the TAI's present in the predefined route and corresponding timing map details to the UE(s) 200. Therefore, the TAI's and the corresponding timing map details helps the UE/Drone 200 avoid unnecessary triggering of location updates to the network 100 while changing from one TAI to another TAI, while traveling in the predefined route. Further, if the UE 200 receives any paging request(s), the network 100 identifies at least one paging cell for the UE 200 travelling in the predefined route and determines a current location/TAI of the UE 200 based on the negotiated one or parameters (for example, based on the speed of the UE 200 travelling the predefined route) or based on the learned mobility patterns of the UE 200. Further, on determining the current location of the UE 200, the network 100 can be configured to indicate the paging request(s) to the UE 200 in at least one of the identified paging cell and at least one guard cell present in the determined current location/TAI of the UE 200 at which the UE 200 travels/ present in that instance as shown in the FIG. 3. The at least one guard cell is determined based on the guard percentage negotiated with the UE(s) 200.

Figure 4:
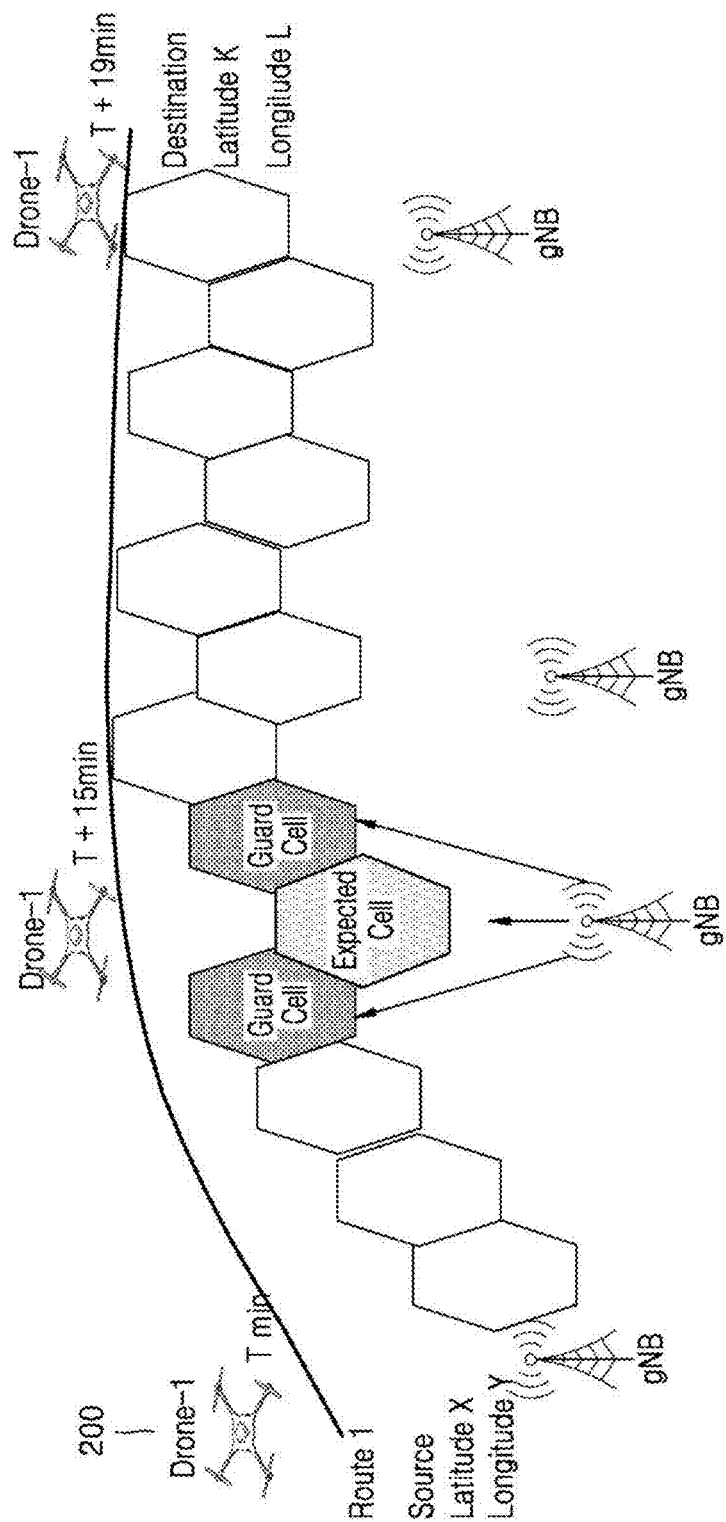
FIG. 4 is an example schematic diagram illustrating a UE reachability estimation procedure and triggering for a re-registration, according to an embodiment as disclosed herein.

FIG. 4 is an example schematic diagram illustrating the UE 200 reachability estimation procedure and triggering for a re-registration, according to an embodiment as disclosed herein.

The UE 200 traveling in the predefined route receives the paging request(s). The network 100 determines the paging request and determines the corresponding location of the UE 200 travelling in the predefined route to indicate the received paging request. To determine the corresponding location of the UE 200, the network 100 can be configured to initiate a reachability estimation procedure to determine the corresponding location of the UE 200 travelling in the predefined route. Based on the determined/negotiated one or parameters, the network 100 can be configured to identify the current location/TAI of the UE 200 in the predefined route. Further, based on the identified current location, the network 100 can be configured to identify at least one of an expected cell and one or more guard cells present in that current location/TAI. Further, the network 100 can be configured to indicate the paging request to the UE 200 through the at least one of the expected cell and the one or more guard cells present in that current location/TAI of the UE 200. Further, In case, if the UE 200 deviates from the predefined route i.e. the UE 200 is not present in the location/TAI corresponding to the time frames indicated in the timing map, the UE 200 triggers a re-registration procedure to re-negotiate the one or more parameters and to inform its location to the network 100.

Figure 5:
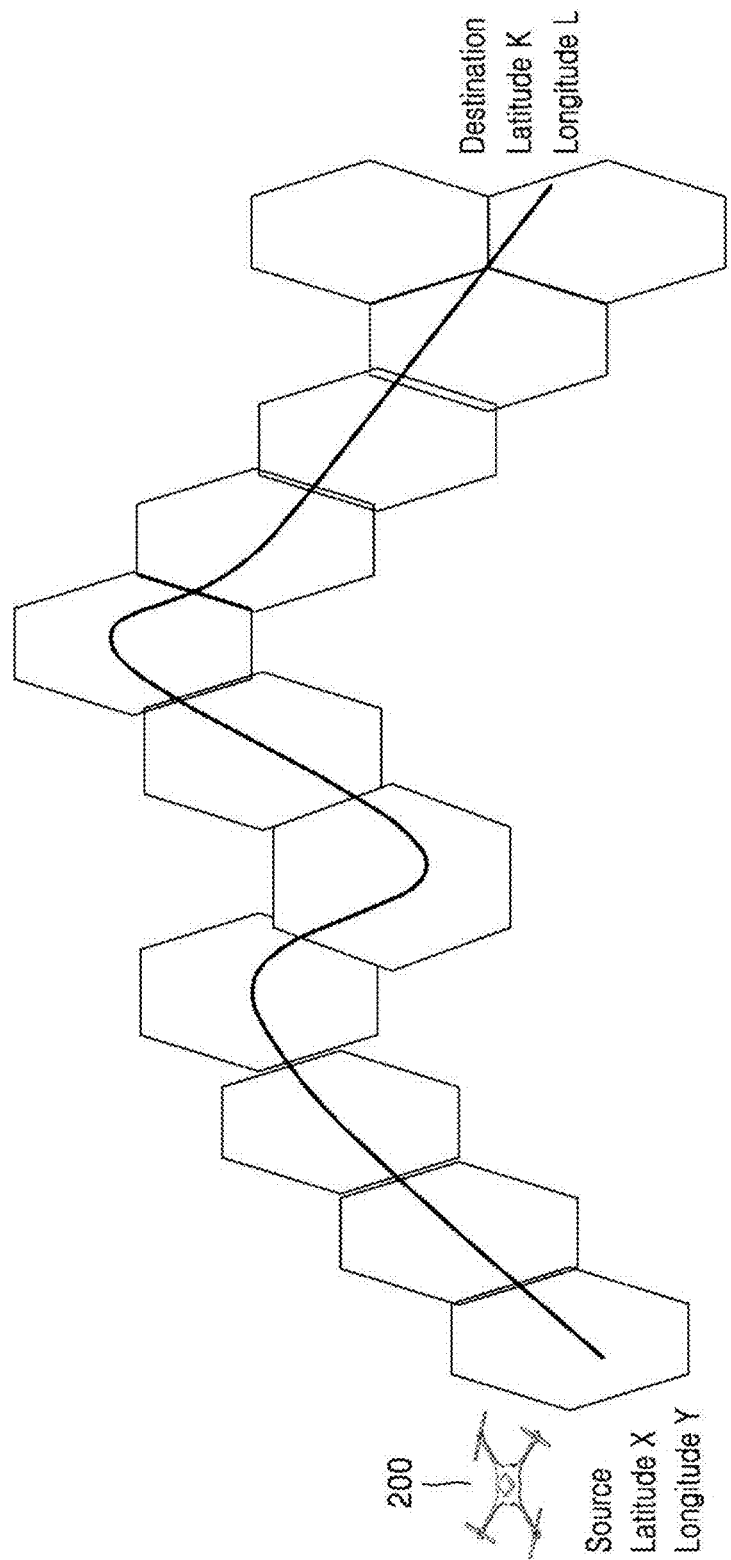
FIG. 5 is an example schematic diagram illustration, wherein a UE measures only predefined cells in a predefined route, according to an embodiment as disclosed herein.

FIG. 5 is an example schematic diagram illustration, wherein the UE 200 measures only predefined cells in the predefined route, according to an embodiment as disclosed herein.

The UE(s) 200 performs Intra/Inter frequency cell measurements continuously while travelling in a route. These cell measurements are power consuming. Similarly, when the UE(s) 200 in a 5G network needs to perform beam scanning whenever the UE(s) 200 enters into a new cell or Scriteria from the current beam is satisfied for measurements. The UE(s) 200 has to scan various beams which may be power consuming operation and there will be delay in the beam selection, if the UE 200 performs exhaustive beam search operation.

Therefore, the embodiments herein handle cell measurements of UE(s) 200 travelling in the predefined route. The network 100 and the UE 200 can be configured to negotiate each other to derive one or more parameters. The one or more parameters includes at least one of the source information of the UE 200 at which the UE 200 starts its travel, the destination information of the UE 200 at which the UE 200 ends its travel, a speed of the UE 200 (i.e., travelling speed), a start time of the travel, a guard percentage, and a predefined route at which the UE (s) 200 travels. Based on the determined/negotiated one or more parameters, the network 100 can be configured to dynamically send the TAI's present in the predefined route and the corresponding timing map to the UE(s) 200. Further, the network 100 can be configured to enable the UE(s) 200 to measure an available frequency associated with TAI's in the predefined route. Further, the network 100 can be configured to enabling the UE(s) 200 to renegotiate the at least one parameter with the network 100, if a camped cell doesn't match with the frequency associated TAI's in the predefined route.

The embodiments herein configure the UE(s)/drone(s) 200 to measuring only a predefined cells present in the predefined route. The UE 200 based on the intelligence acquired measures only required earfcns/beams and avoids all other neighbor cell measurements. Further. The Network 100 based on the UEs 200 route/direction can allocate the best possible limited set of earfcns to measure. Further, additionally the network 100 can broadcast additional information (example eNodeB's location or earfcn for each direction) which aids the UE 200 to reduce the number of inter frequency measurements. Alternately after UE 200 learns the possible EARFCN/Cell or negotiated cell priority information available from the network 100, the UE 200 first (prioritizes) measure the expected cell out of the available cells or EARFCN information, if it doesn't satisfy the signal strength then it starts measuring the next expected cell in priority as per the learnt or negotiated cell priority information available from the network 100.

FIGS. 6-9 are example schematic diagrams illustrating handover (HO) optimization in the predefined route, according to an embodiment as disclosed herein.

A network 100 involves continuous measurement reports and executing HO procedure which can cause the UE(s) 200 battery to drain and also results HO failure. Further, during a normal HO scenario a Target node B/AMF (Access and Mobility Management Function) always needs to create or get the context of the UE(s) 200 from old nodes, which results latency issues.

Figure 6:
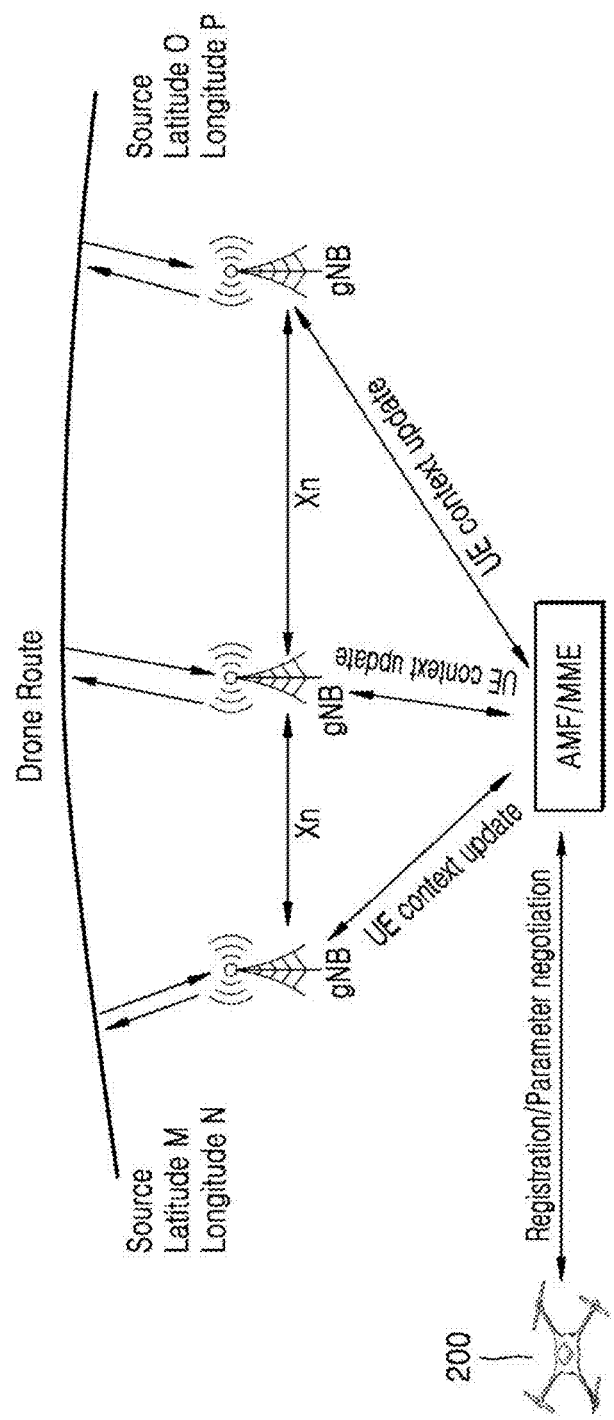
FIGS. 6-9 are example schematic diagrams illustrating handover (HO) optimization in a predefined route, according to an embodiment as disclosed herein.

FIG. 6 illustrates the AMF/MME (Mobility Management Entity) for updating a context of the UE(s) 200 to all eNB/gNB present in the predefined route during registration. As showing in the FIG. 6, during the one or more parameter negotiation, the AMF/MME can inform all the eNBs/gNBs in the predefined route and provide the context of the UE(s) 200 beforehand. In case of any change in the context (ex. security), the same can be updated to all the eNBs/gNBs by the AMF. Further, the UE(s) 200 (for example Drone) directly latch on to the next available cell and provide a radio access network (RAN) message similar to HO complete which can be treated as HO procedure completed. Further, a Target eNB/gNB informs a source eNB/gNB to release the context of the UE(s) 200.

Figure 7:
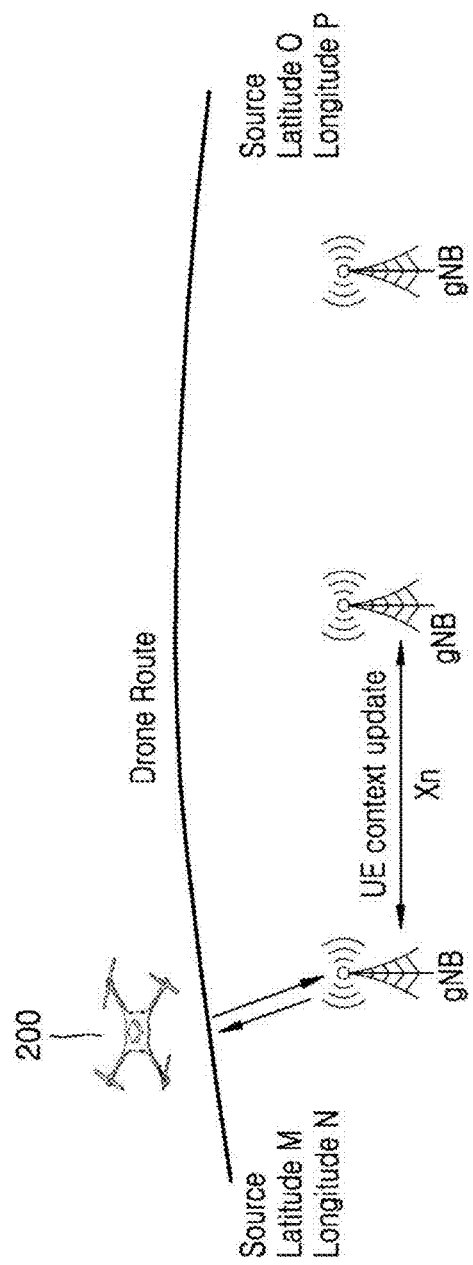

FIG. 7 illustrates the eNB/gNBs updating the next RAN node/eNB/gNBs with the context of the UE 200. The RAN nodes, keep updating the next node with the context of the UE 200 (ex: Drone). Further, the possible/predefined RAN nodes can be shared by the AMF and the same predefined list can be forwarded/circulated to next probable node. Therefore, the UE(s) 200 knows the possible list of the predefined RAN nodes, which helps the UE(s) 200 to directly latch on to the next available cell/RAN node and provide the RAN message similar to HO complete which can be treated as HO procedure completed. Further, the target eNB informs the source eNB to release the context of the UE 200.

Figure 8:
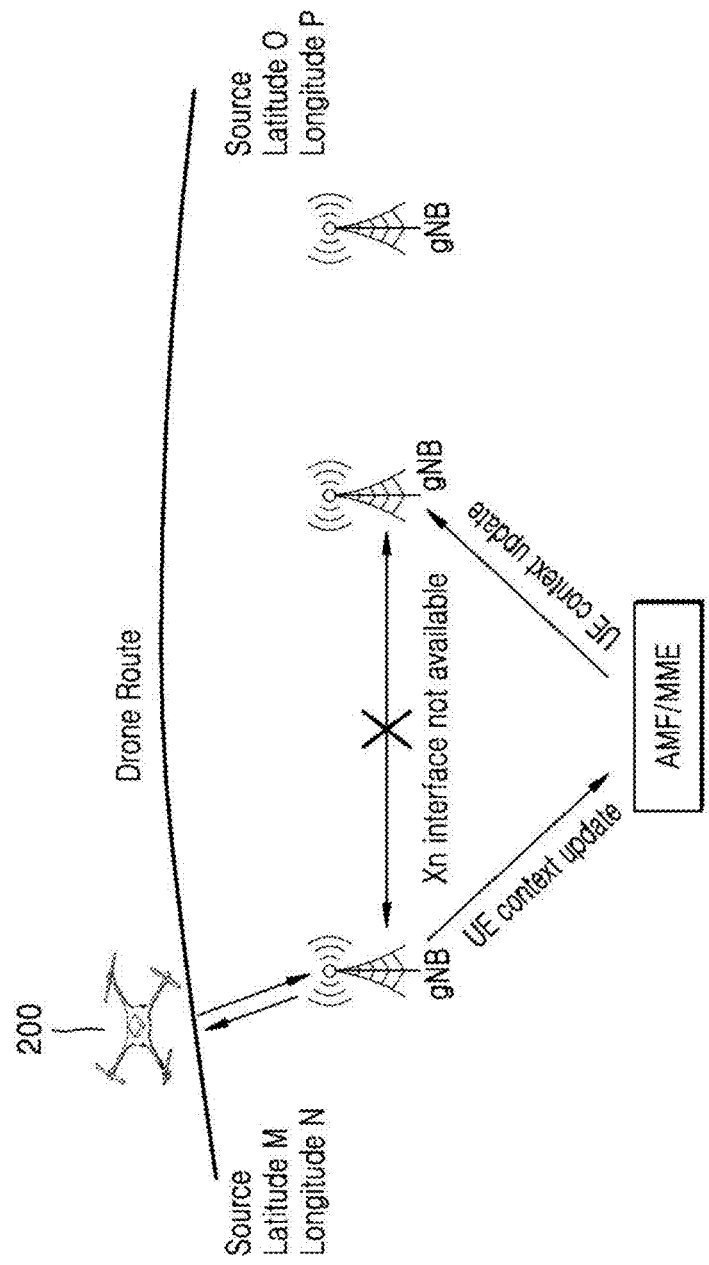

FIG. 8 illustrates the eNB/gNBs updating the next RAN node through AMF when Xn interface is not available. The RAN nodes on detecting the unavailability of Xn interface, can route the update message to the other RAN node through AMF.

Figure 9:
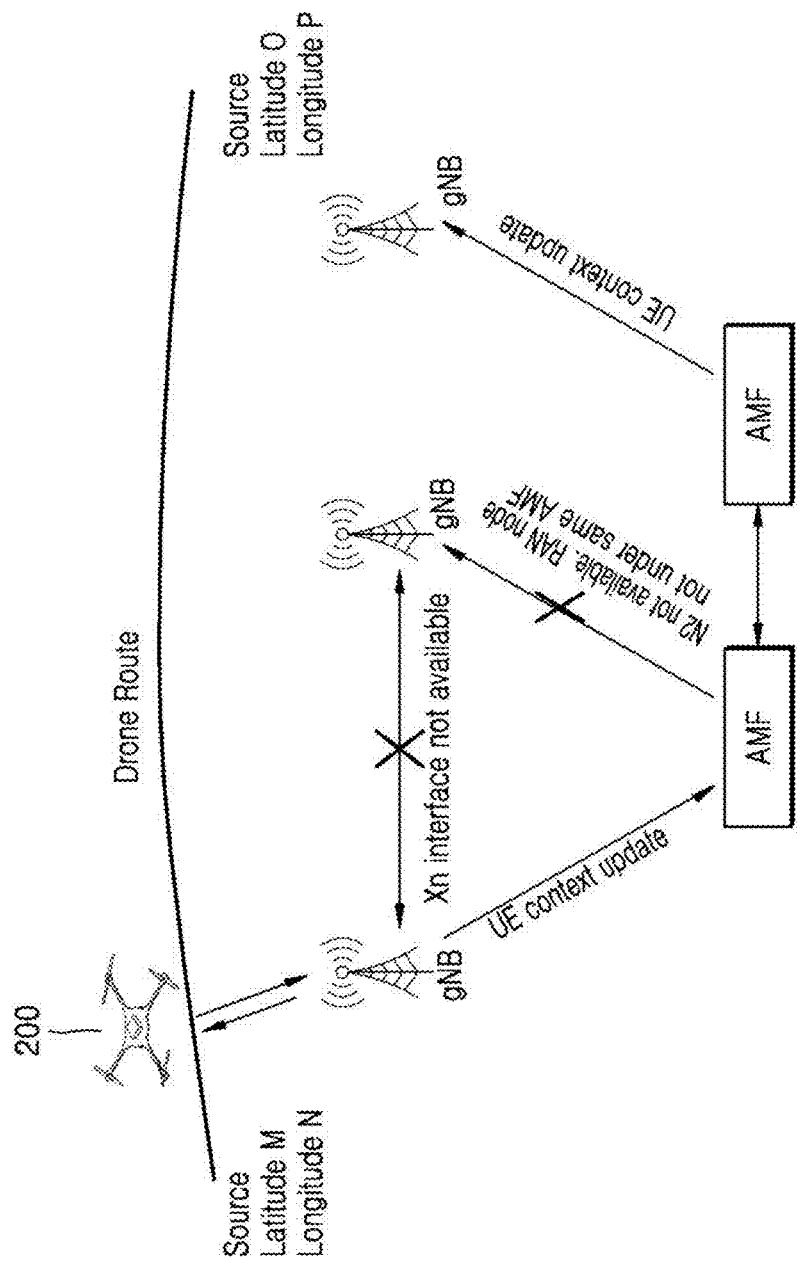

FIG. 9 illustrates the eNB/gNBs updating the next RAN node through AMF-AMF interworking. In case of unavailability of the Xn interface and if the destination RAN node is not under the same AMF, then the context can be forwarded through the AMF interworking.

Figure 10:
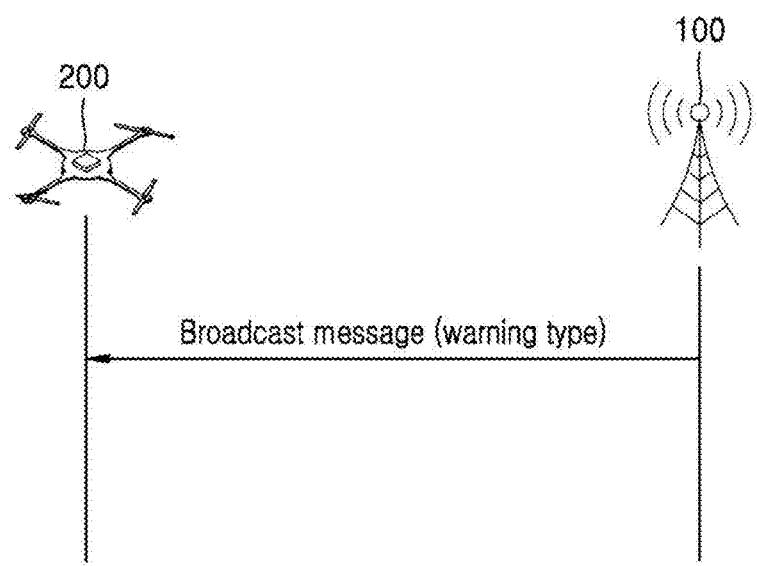
FIG. 10 is a sequence diagram illustrating the network broadcasting a message to a drone travelling in a predefined route, according to an embodiment as disclosed herein.

FIG. 10 is a sequence diagram illustrating the network 100 broadcasting a message to a drone travelling in a predefined route, according to an embodiment as disclosed herein.

The embodiments herein broadcast the message (i.e., emergency warning message) to the UE(s)/drone(s) 200 travelling in the predefined route to indicate the emergency in the predefined route.

When the UE(s)/drone(s) 200 is travelling from a source to destination in the predefined route may exposed to different climatic conditions. In such kind of situation to bring down the UE(s)/drone(s) 200 to a safety zone to avoid any physical damages to the UE(s)/drone(s) 200. The network 100 can be configured to broadcasts or send the emergency warning message to the UE(s)/drone(s) 200 travelling in the predefined route to indicate the emergency in the predefined route and to indicate the safety zone for the safe landing in the predefined route to avoid the physical damage.

Figure 11:
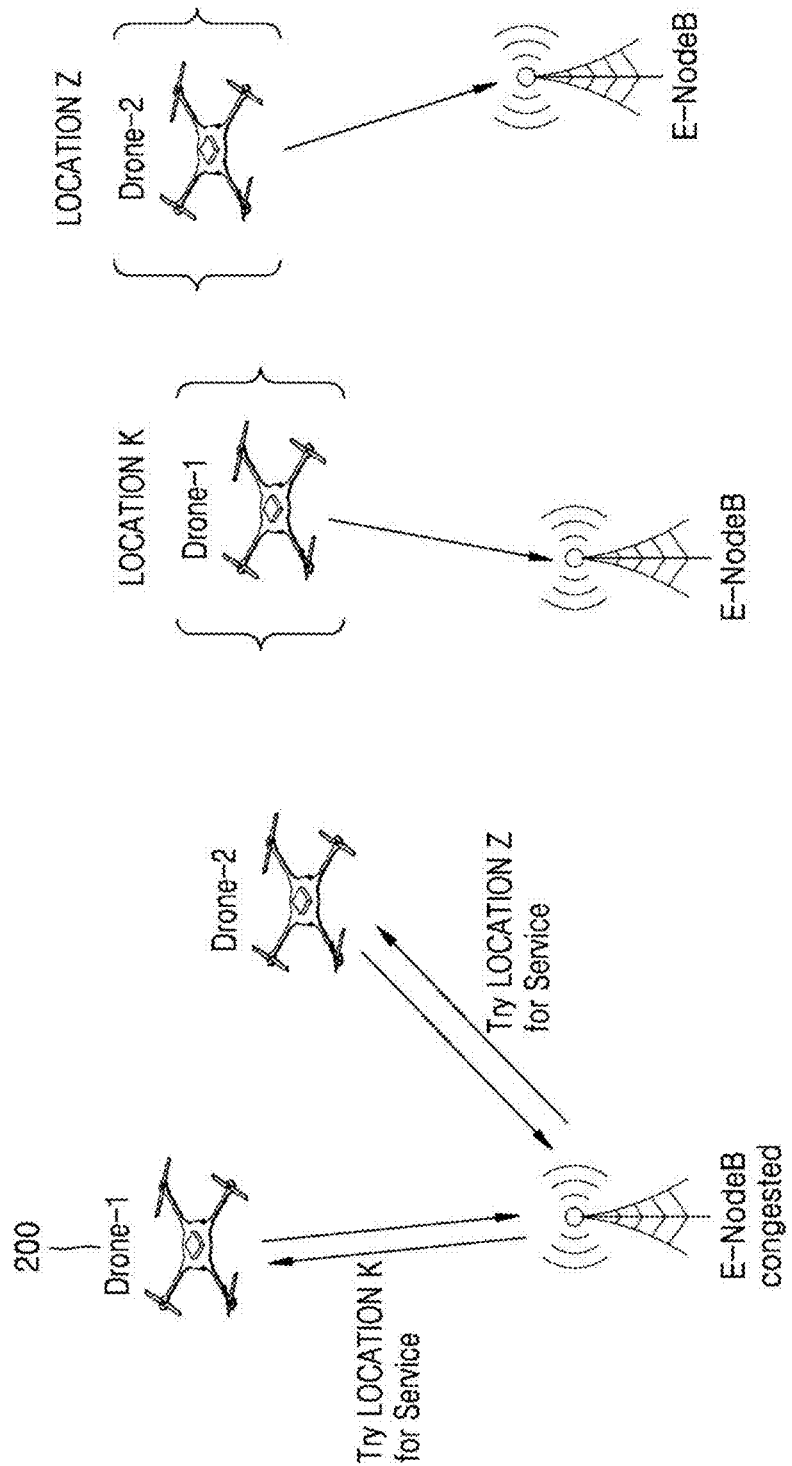
FIG. 11 is an example schematic diagram illustration, wherein a Network shares a location to the UE in a predefined route to retry services, according to an embodiment as disclosed herein.

FIG. 11 is an example schematic diagram illustration, wherein the Network 100 shares a location to the UE 200 in the predefined route to retry service, according to an embodiment as disclosed herein.

Once the UE 200 (For example, drone) starts operating in the predefined route, there can be a possible congestion scenario where multiple UE(s) 200 trying to request for service to uplink data. Because of the reason, there can be lot of congestion in a particular e-NB/gNB. In order to avoid the congestion in the eNB of a particular location, the Network 100 during the registration/attach informs the UE(s) 200 regarding the cells or locations in the predefined route where it can send heavy data. So that the UE(s) 200 can retry services in that cells or locations.

To avoid the congestion, the network 100 can provide information regarding the location/time to the UE(s)/drones 200 travelling in the predefined route to retry the services. The network 100 can be configured to decide the next possible eNB which can serve the drone and the same is indicated to the corresponding UE(s)/Drone(s) 200.

Figure 12:
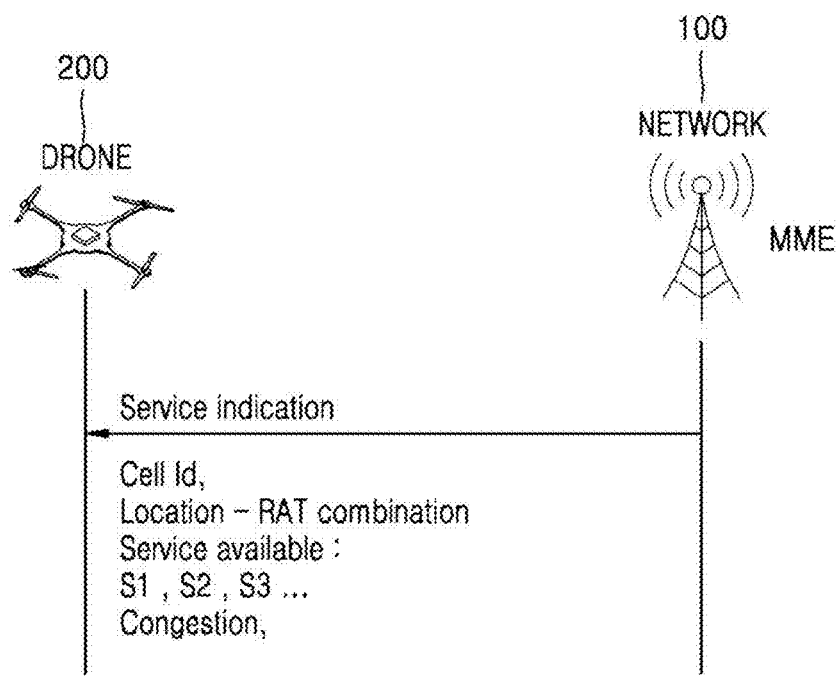
FIG. 12 is an example sequence diagram illustration, wherein the Network share a location/cells information along with available services list to the UE(s) to notify available services in a location in a predefined route, according to an embodiment as disclosed herein.

FIG. 12 is an example sequence diagram illustration, wherein the Network 100 share a location/cells information along with available services list to the UE(s) 200 to notify available services in the location in the predefined route, according to an embodiment as disclosed herein.

The network 100 may receive at least one service request from the UE(s) 200 while travelling in the predefined route. Based on the received at least one service request, the network 100 indicates a service indication message for the requested at least one service to serve the UE(s) 200 for the requested at least one service. The service indication message includes at least one of a cell id, location details, available services, congestion details and coverage information. So that, the UE(s) can access that particular service based on the received service indication message.

Figure 13:
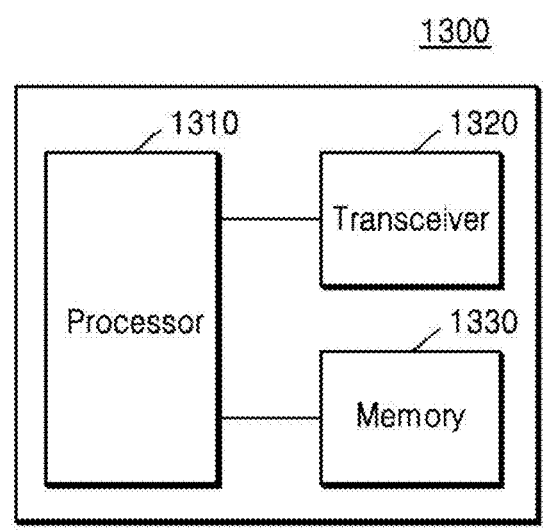
FIG. 13 is a block diagram illustrating the structure of a user equipment according to another embodiment of the present disclosure.

FIG. 13 is a block diagram illustrating the structure of a user equipment according to another embodiment of the present disclosure.

Referring to the FIG. 13, the user equipment 1300 may include a processor 1310, a transceiver 1320 and a memory 1330. However, all of the illustrated components are not essential. The user equipment 1300 may be implemented by more or less components than those illustrated in FIG. 13. In addition, the processor 1310 and the transceiver 1320 and the memory 1330 may be implemented as a single chip according to another embodiment. The aforementioned components will now be described in detail.

The processor 1310 may include one or more processors or other processing devices that control the proposed function, process, and/or method. Operation of the user equipment 1300 may be implemented by the processor 1310.

The processor 1310 may sense each configured resource pool and/or each group of resources to obtain a result of sensing, the result of sensing containing a set of remaining candidate single TU resources of each resource pool. The processor 1310 may select, from the set of remaining candidate single TU resources of each resource pool and/or each group of resources, one candidate single TU resource as a transmission resource.

The transceiver 1320 may include a RF transmitter for up-converting and amplifying a transmitted signal, and a RF receiver for down-converting a frequency of a received signal. However, according to another embodiment, the transceiver 1320 may be implemented by more or less components than those illustrated in components.

The transceiver 1320 may be connected to the processor 1310 and transmit and/or receive a signal. The signal may include control information and data. In addition, the transceiver 1320 may receive the signal through a wireless channel and output the signal to the processor 1310. The transceiver 1320 may transmit a signal output from the processor 1310 through the wireless channel.

The memory 1330 may store the control information or the data included in a signal obtained by the device 1300. The memory 1330 may be connected to the processor 1310 and store at least one instruction or a protocol or a parameter for the proposed function, process, and/or method. The memory 1330 may include read-only memory (ROM) and/or random access memory (RAM) and/or hard disk and/or CD-ROM and/or DVD and/or other storage devices.

Figure 14:
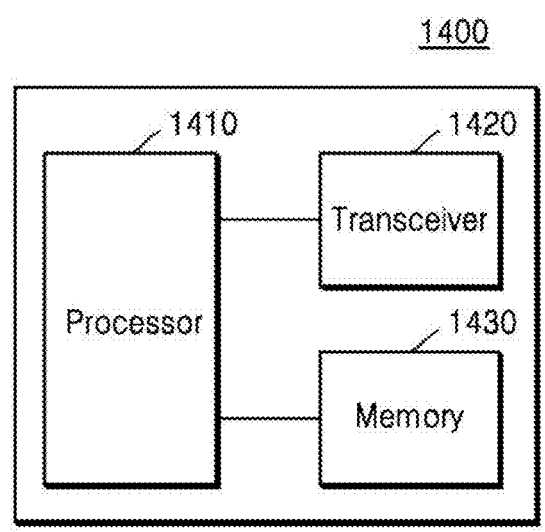
FIG. 14 is a block diagram illustrating the structure of a device for sidelink communication according to another embodiment of the present disclosure.

FIG. 14 is a block diagram illustrating the structure of a device for network according to another embodiment of the present disclosure.

Referring to the FIG. 14, the device for network 1400 may include a processor 1410, a transceiver 1420 and a memory 1430. However, all of the illustrated components are not essential. The device 1400 may be implemented by more or less components than those illustrated in FIG. 14. In addition, the processor 1410 and the transceiver 1420 and the memory 1430 may be implemented as a single chip according to another embodiment. The aforementioned components will now be described in detail.

The processor 1410 may include one or more processors or other processing devices that control the proposed function, process, and/or method. Operation of the device 1400 may be implemented by the processor 1410.

The processor 1410 may determine the locations of transmission resources and reception resources.

The transceiver 1420 may include a RF transmitter for up-converting and amplifying a transmitted signal, and a RF receiver for down-converting a frequency of a received signal. However, according to another embodiment, the transceiver 1420 may be implemented by more or less components than those illustrated in components.

The transceiver 1420 may be connected to the processor 1410 and transmit and/or receive a signal. The signal may include control information and data. In addition, the transceiver 1420 may receive the signal through a wireless channel and output the signal to the processor 1410. The transceiver 1420 may transmit a signal output from the processor 1410 through the wireless channel.

The memory 1430 may store the control information or the data included in a signal obtained by the device 1400. The memory 1430 may be connected to the processor 1410 and store at least one instruction or a protocol or a parameter for the proposed function, process, and/or method. The memory 1430 may include read-only memory (ROM) and/or random access memory (RAM) and/or hard disk and/or CD-ROM and/or DVD and/or other storage devices.

The embodiments disclosed herein can be implemented through at least one software program running on at least one hardware device and performing network management functions to control the elements. The elements shown in FIG. 1 to FIG. 14 can be at least one of a hardware device, or a combination of hardware device and software module.

The foregoing description of the specific embodiments will so fully reveal the general nature of the embodiments herein that others can, by applying current knowledge, readily modify and/or adapt such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

The invention claimed is:

1. A method for handling mobility of User Equipment's (UEs) in a predefined route, the method comprising:
   determining, by a network, one of at least one parameter and learned mobility patterns of at least one User Equipment (UE), wherein the at least one parameter is determined based on a negotiation with the at least one UE; and
   sending, by the network, at least one pair of a tracking area identifier list (TAI's) and a timing map to the at least one UE based on the determined one of the at least one parameter and the learned mobility patterns of the at least one UE.

2. The method of claim 1, wherein the at least one parameter includes at least one of a source information, a destination information, a speed, a start time, a guard percentage, and a predefined route of the at least one UE.

3. The method of claim 1, wherein the at least one UE triggers a new registration procedure to indicate a current location of the at least one UE to the network, if the at least one UE is not following the learned mobility patterns or is not present in the TAI's during a corresponding time frame in the at least one pair of the TAI's and the timing map from the network.

4. The method of claim 1, wherein the at least one UE is considered to be registered with the network, if the at least one UE is present in any one of a TAI's during a corresponding time frame in the at least one pair of the TAI's and the timing map from the network.

5. The method of claim 1, wherein at least one paging cell is determined based on the determined one of at least one parameter and the learned mobility patterns and at least one guard cell is determined based on a guard percentage negotiated with the at least one UE to Indicate at least one paging request in the determined at least one paging cell and the at least one guard cell present in a current location of the UE in the predefined route.

6. The method of claim 1, wherein the method further comprises: enabling, by the network, the at least one UE to prioritize measuring one or more frequencies associated with the TAI's present in the predefined route; and enabling, by the network, the at least one UE to renegotiate the at least one parameter with the network, if a camped cell doesn't match with the one or more frequencies associated with the TAI's.

7. The method of claim 1, wherein the method further comprises:
   sending, by the network, a context of the at least one UE to a plurality of cells associated with the TAI's of the predefined route, wherein the context of the at least one UE is determined based on one of the determined at least one parameter and the learned mobility patterns of the at least one UE; and
   enabling, by the network, the at least one UE to latch on to a cell associated with the TAI's present in the predefined route based on a current location of the at least one UE, wherein the cell indicates its previous cell to release the context of the UE.

8. The method of claim 1, wherein the method further comprises: enabling, by the network, a serving Access and Mobility Management function (AMF) to send a context of the at least one UE to another AMF automatically, if the at least one UE expected to be camped on to at least one cell belongs to another AMF in the predefined route.

9. The method of claim 1, wherein the method further comprises: determining, by the network, an emergency situation in the predefined route where the at least one UE is travelling; and alerting, by the network, the at least one UE regarding the determined emergency situation present in the predefined route through a message, wherein the message includes details of a safety location to land in the predefined route.

10. The method of claim 1, wherein the method further comprises:
    determining, by the network, at least one service request for uplink data from the at least one UE while travelling in the predefined route; and
    allocating, by the network, at least one of a time, a location and a cell information for a corresponding at least one UE based on one of the determined at least one parameter and the learned mobility patterns to complete a corresponding at least one service request for the uplink data.

11. The method of claim 1, wherein the method further comprises:
    receiving, by the network, at least one service request from the at least one UE while travelling in the predefined route; and indicating, by the network, a service indication message for the requested at least one service request to serve the at least one UE for the requested at least one service, wherein the service indication message includes at least one of a cell id, location details, available services, congestion details and coverage information.

12. A base station in a wireless communication system, the base station comprising:
    a transceiver; and
    at least one processor coupled to the transceiver and configured to:
    determine one of at least one parameter and learned mobility patterns of at least one User Equipment (UE), wherein the at least one parameter is determined based on a negotiation with the at least one UE; and send at least one pair of tracking area identifier list (TAI's) and a timing map to the at least one UE based on the determined one of the at least one parameter and the learned mobility patterns of the at least one UE.

13. The base station of claim 12, wherein the at least one UE triggers a new registration procedure to indicate a current location of the at least one UE to the base station, if the at least one UE is not following the learned mobility patterns or is not present in the TAI's during a corresponding time frame in the at least one pair of the TAI's and the timing map from the base station.

14. The base station of claim 12, wherein at least one paging cell is determined based on the determined one of at least one parameter and the learned mobility patterns and at least one guard cell is determined based on a guard percentage negotiated with the at least one UE to indicate at least one paging request in the determined at least one paging cell and the at least one guard cell present in a current location of the at least one UE.

15. The base station of claim 12, wherein the at least one processor is further configured to:
    enable a serving Access and Mobility Management function (AMF) to send a context of the at least one UE to another AMF automatically, if the at least one UE expected to be camped on to at least one cell belongs to another AMF.

* * * * *